Dec. 17, 1946.  CHUNG-CHIN KAO  2,412,777
CHINESE LANGUAGE TYPEWRITER AND THE LIKE
Original Filed July 7, 1943   12 Sheets-Sheet 1

CHUNG-CHIN KAO
INVENTOR

BY John J. Rogan
ATTORNEY

Dec. 17, 1946.    CHUNG-CHIN KAO    2,412,777
CHINESE LANGUAGE TYPEWRITER AND THE LIKE
Original Filed July 7, 1943    12 Sheets-Sheet 2

CHUNG-CHIN KAO
INVENTOR

BY John J. Rogan
ATTORNEY

Dec. 17, 1946.     CHUNG-CHIN KAO     2,412,777
CHINESE LANGUAGE TYPEWRITER AND THE LIKE
Original Filed July 7, 1943    12 Sheets-Sheet 3

INVENTOR
CHUNG-CHIN KAO
BY John J. Rogan
ATTORNEY

Dec. 17, 1946.   CHUNG-CHIN KAO   2,412,777
CHINESE LANGUAGE TYPEWRITER AND THE LIKE
Original Filed July 7, 1943    12 Sheets-Sheet 4

INVENTOR
CHUNG-CHIN KAO
BY John J. Rogan
ATTORNEY

Dec. 17, 1946. CHUNG-CHIN KAO 2,412,777
CHINESE LANGUAGE TYPEWRITER AND THE LIKE
Original Filed July 7, 1943 12 Sheets-Sheet 7

CHUNG-CHIN KAO
INVENTOR

BY John J. Rogan
ATTORNEY

Dec. 17, 1946. CHUNG-CHIN KAO 2,412,777
CHINESE LANGUAGE TYPEWRITER AND THE LIKE
Original Filed July 7, 1943 12 Sheets-Sheet 9

Fig.23.

INVENTOR
CHUNG-CHIN KAO
BY John J. Rogan
ATTORNEY

Dec. 17, 1946. CHUNG-CHIN KAO 2,412,777
CHINESE LANGUAGE TYPEWRITER AND THE LIKE
Original Filed July 7, 1943 12 Sheets-Sheet 10

Fig. 24.

CHUNG-CHIN KAO
INVENTOR

BY John J. Rogan
ATTORNEY

Dec. 17, 1946.   CHUNG-CHIN KAO   2,412,777
CHINESE LANGUAGE TYPEWRITER AND THE LIKE
Original Filed July 7, 1943   12 Sheets-Sheet 11

Fig. 22.

CHUNG-CHIN KAO
INVENTOR

BY John J. Logan
ATTORNEY

Dec. 17, 1946.  CHUNG-CHIN KAO  2,412,777
CHINESE LANGUAGE TYPEWRITER AND THE LIKE
Original Filed July 7, 1943  12 Sheets-Sheet 12

Fig. 28.

CHUNG-CHIN KAO
INVENTOR

BY *John J. Rogan*
ATTORNEY

Patented Dec. 17, 1946

2,412,777

UNITED STATES PATENT OFFICE 2,412,777

CHINESE LANGUAGE TYPEWRITER AND THE LIKE

Chung-Chin Kao, New York, N. Y.

Continuation of application Serial No. 493,722, July 7, 1943. This application June 28, 1944, Serial No. 542,492

23 Claims. (Cl. 197—1)

This invention relates to typewriters and more particularly to typewriters which are capable of printing directly any ideographic characters, such as Chinese characters and the like.

A principal object of the invention is to provide a keyboard-controlled machine for printing a large number of Chinese characters with a very much smaller number of keys. In achieving this object, the large number of characters are selected by the keyboard by percentage type digit selectors.

A still further object is to provide an improved digit selecting system for selecting one of 6000 Chinese characters for printing under control of a specially devised four digit numbered code.

A feature of the invention relates to a novel form of type-face cylinder for use in Chinese character printing machines generally.

Another feature relates to a novel method and mechanisms for mechanically or electro-mechanically selecting for printing or transfer, one of a large number of Chinese characters.

Another feature relates to a Chinese character printing machine comprising a rotatable drum or cylinder carrying on its periphery a large number of Chinese characters, e. g., 6000, arranged in co-ordinate rows, in conjunction with a coordinate selecting system whose operation is controlled in accordance with a specially devised numerical code.

Another feature relates to keyboard-controlled Chinese character printing machines, e. g., a manually or electrically operated typewriter with four banks of keys, each bank being allotted to a corresponding digit of a 4-digit numerical code. One pair of key banks controls the coordinate setting of a series of line-selecting members, e. g., 60; while the second pair of key banks controls the selective setting of one of a series of "rows," e. g., 100 rows. The 6000 characters are arranged on a plate or cylinder in 60 circumferential "lines" and each "line" comprises 100 separate characters. Thus the successive operation of a numbered key in each of the four banks causes the selection of a definite one of the 6000 characters, which upon selection can be used to print or transfer to a suitable printing surface, e. g., a page of paper.

Another feature relates to a novel form of Chinese character printing platen for automatic or manually-controlled keyboard printing machines.

A further feature relates to a keyboard-controlled mechanism whereby a keyboard of 36 keys is provided with actuating mechanism whereby the operation of a set of four keys automatically selects for printing, a definite one of 6000 characters.

A further feature relates to an electrical selecting circuit for use with Chinese character printing machines, e. g., typewriters, Linotypes, "teletypes," etc., whereby any one of 6000 Chinese characters can be automatically selected and printed merely by operating a set of four keys whose digital sequence is coded with the character to be printed.

A still further feature relates to the novel organization, arrangement and relative interconnection of parts which cooperate to produce a simple and accurate Chinese language printer such as a typewriter, "Teletype," Linotype and the like.

Other features and advantages not specifically enumerated will become apparent after a consideration of the following descriptions and the appended claims.

In the drawings, which represent certain preferred embodiments,

Fig. 7 is a detailed view of the selection stopping cam for the selective rotary movement of the printing drum.

Fig. 27 is a simplified schematic explanatory diagram of the invention.

The typewriter, according to the invention, is adapted to print any one of 6000 characters of which 5900 are Chinese ideographs and 100 are for special indicia such as English alphabet letters, numbers, symbols, etc. The invention is capable of embodiment in a purely mechanical typewriter (Figs. 1 to 18) or in an electrically controlled typewriter (Figs. 19 to 24). Any well-known kind of motive power may be used for moving the printing drum, paper carriage, etc. In the mechanical embodiment, the drum and paper carriage may each be provided with a separate spring motor which may be wound up manually during the return movement of the paper carriage as is well-known in the typewriter art. If desired, these motors may be separate hand-wound spring motors such as phonograph motors which can be wound up at regular intervals to provide the necessary motive power.

Figure 1:
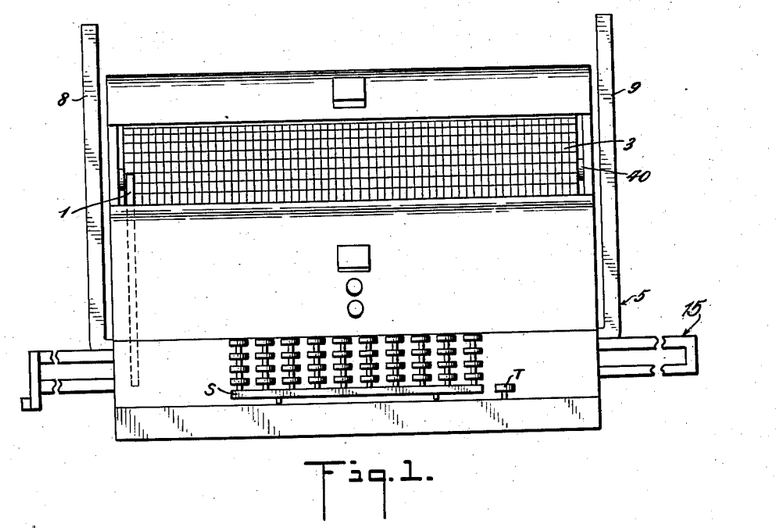
Fig. 1 is a front face view of a typewriter embodying the inventive features.
Figure 2:
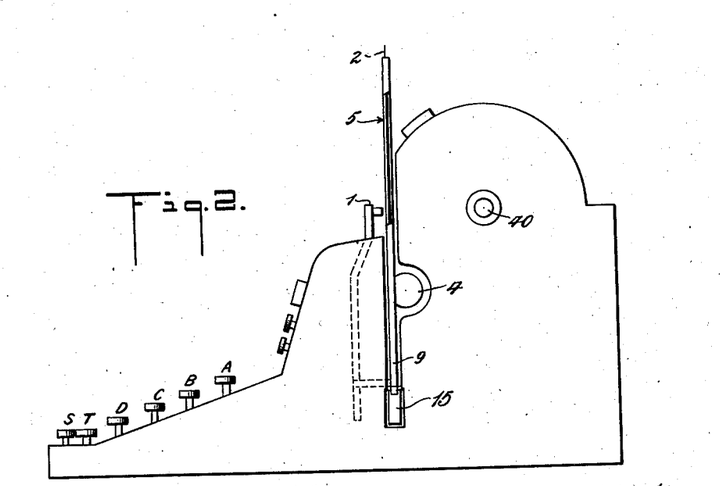
Fig. 2 is a right-hand end view of Fig. 1.
Figure 3:
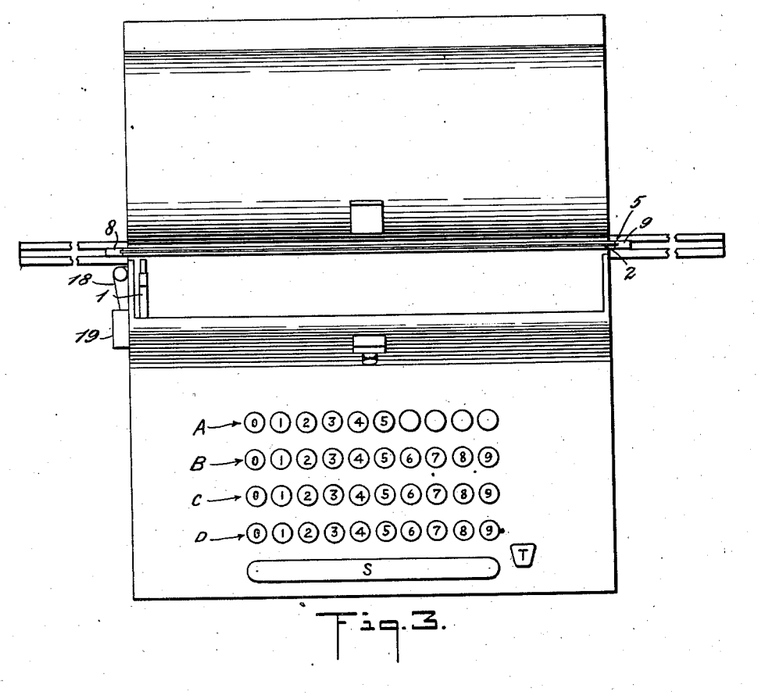
Fig. 3 is a top-plan view of Fig. 1.

The machine has a keyboard consisting of four rows A, B, C, D, (Figs. 1, 2 and 3). Row A has numbered keys 0 to 5. The numerical keys of row A are operated in accordance with the first or thousands digit of a four-unit code number which is previously assigned to each of the 5900 Chinese ideographs. Row B has ten keys 0 to 9, which are operated in accordance with the hundreds digit of the said code number. Likewise, rows C and D, each of ten keys, are operated respectively in accordance with the tens and units digit of the code number. After a key in each of the rows has been operated, the printing control key T is operated, whereby a pivotally mounted printing hammer 1 presses the paper 2 against the selected character on the printing drum 3, it being understood that a suitable inked ribbon is located between the paper and the drum. The paper 2 is supported in a tubular holder 4 which is attached to a paper carriage 5. The member 4 has a slot to permit the paper to pass upwardly between rubber rollers 6, 7, carried by the vertical arms 8, 9, of the carriage 5. A pair of pressure rollers 10, 11, cooperate with rollers 6, 7, to control the line spacing of the paper. Each of the rollers 10, 11, has a line feed wheel 12, 13, with suitable one-way ratchet mechanism (not shown) so that by turning either wheel 12 or 13, the paper can be indexed vertically any desired line spacing distance. Inasmuch as such line index mechanisms are well-known in typewriter constructions, detailed description thereof is not required herein.

The carriage 5 is slidably mounted, preferably on ball bearings 14 (Fig. 14), in the channeled upper edge of a selectively shiftable holder 15, which itself is slidable so as to position the printing hammer 1 carried by holder 15, in registry with a selected circumferential row of type face characters on drum 3. In order to space the paper to the left the distance of one letter space after the printing of each character and in order to move the members 5 and 15 as a unit to the right for the selective setting, there is attached to member 8 of the paper carriage a spring-pressed detent 16 which cooperates with a toothed rack 17 supported for slight upward and downward movement on bracket 17a at opposite ends of member 15. The member 17 is normally held in its raised position by springs 17b and is adapted to be momentarily lowered to allow the detent 16 to clear a tooth in the member 17 so that the paper carriage 5 can be indexed to the left one letter space. The carriage 5 is connected by a cord or cable 18 to a spring motor 19 (Fig. 6), which is normally wound up so as to tend to pull the carriage 5 to the left (Fig. 9). The lug 23 which depends from the member 15 carries a lug 23a extending at right angles to the member 15 and whose rounded end 23b is adapted to engage the lower arm of toggle link 23d whose upper arm is connected to the ratchet bar 17. Consequently, just as the member 15 returns to its normal position the toggle 23 is momentarily broken to lower the bar 17 and thereby allow the paper carriage 5 to index one letter space to the left under control of tensioned cable 18, whereupon the detent 16 engages the next tooth in the said bar 17. Also attached to the rear face of member 15 (Fig. 9), is another ratchet bar 15a, which cooperates with a spring-pressed detent 15b, so that when member 15, which carries printing hammer 1, selectively moves to the right it carries with it the paper holder 5. Detent 15b of course does not interfere with the movement of holder 5 to the left and likewise detent 16 does not interfere with the movement of holder 5 to the right. The member 23d is also connected through suitable linkage (not shown) to the spacer bar S so that by depressing that bar the ratchet bar 17 can be momentarily lowered to effect spacing of the paper carriage 5 without printing, thus allowing spring motor 19 to index the carriage 5 one letter space to the left. At the end of each printed line, carriage 5 can be manually returned to the right in the manner well-known in typewriter constructions for example by any well-known carriage return lever (not shown) which when it is operated to restore the carriage, raises the pawl 15b from engagement with the rack 15a, causing spring motor 19 to be rewound.

The selective carriage 15 on which the paper carriage 5 is slidable is supported on ball bearing guides or rails 20, which are attached to a suitable fixed bracket 21. The carriage 15 is of the return-to-normal type, its normal position being at the extreme left as shown in Fig. 9. For this purpose, carriage 15 is connected to a spring-tensioned cord or cable 22 which tends to hold the carriage with its downwardly projecting stop lug 23 in engagement with a fixed abutment 24. Member 15 carries a horizontal rack bar 25 (Figs. 9 and 14), and mounted to cooperate with rack 25 is a spring-pressed locking pawl 26 (Fig. 9) which normally prevents carriage 15 moving to the left after carriage 15 has been selectively set. However, pawl 26 is connected through a suitable link 26a to the printing key T, so that when that key is depressed and then released, it releases pawl 26 and allows the carriage 15 to move to the left by means of the tension on cable 22. Carriage 15 is positively driven to effect its selective positioning. The extent of the selective sliding movement of carriage 15 is controlled by the lug 23 which is adapted to engage a selected one of the sixty shiftable stops 27, arranged to be selected on a percentage basis as will be described hereinbelow. It will be understood of course that the stops 27 are normally out of the path of the stop lug 23.

Figure 6:
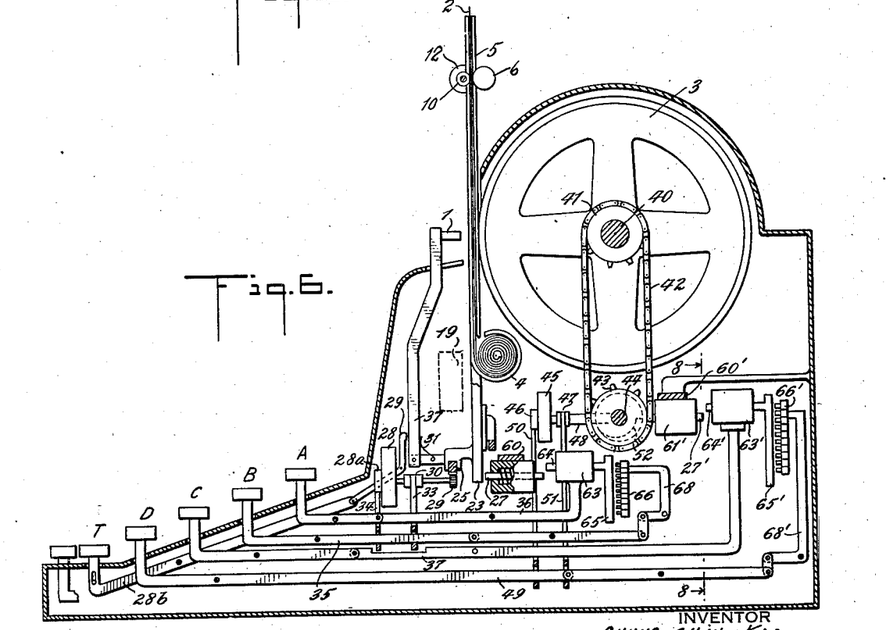
Fig. 6 is an end elevational view similar to Fig. 2, but with certain cover plates removed to show the essential internal structural arrangements.

For the purpose of driving the carriage 15 in its selective movement, there is provided a pinion wheel 29 which engages the teeth of bar 25. Wheel 29 is connected to the spring motor 28 which tends to drive the wheel 29 in a clockwise direction (Fig. 9). Motor 28 is connected to wheel 29 through any well-known shiftable clutch arrangement 30, the shiftable element 31 of which is connected to a bail 33, so that when a key in row B is depressed it releases pawl 26, and clutches wheel 29 to the motor shaft 32. It will be understood that motor 28 is also provided with a one-way pawl and ratchet detent 28a, which normally prevents the motor shaft 32 from rotating. The detent of pawl 28a is connected to a bail 34 which extends across the key levers 35 of row B. As long as any key in row B is depressed, the wheel 29 is coupled to motor 28 which is at the same time released for rotation. Thus carriage 15 is positively driven to the right until it engages the previously set selective stop 27. By means of pawl 26 and bar 25, the carriage 15 is held in its selected position until after the printing hammer 1 has executed its printing blow. The hammer 1 is pivotally attached at its lower end to the carriage 15 at the left-hand end thereof, so as to pivot about a horizontal axis only, but is movable rigidly as a unit with carriage 15. The key T operates a pull bar 28b which carries a bail 29 normally out of contact with the arm 37 of the printing hammer (Fig. 6). Hammer 1 is normally held in a non-printing position away from the paper 2, by a suitable spring 31. However, key T is not intended to be operated for printing until a key in each of the rows A, B, C and D, has been operated.

In response to the operation of a key in row A and then in row B, the carriage 15 is positioned with the hammer 1 in alignment with the selected circumferential row of characters on drum 3. The next step in the operation is to rotate the drum to bring the particular character in the selected circumferential row of the drum into printing relation with the hammer. For this purpose, drum 3 is keyed to a shaft 40 which is mounted for rotation in suitable bearings (not shown) and attached to one end of shaft 40 is a sprocket 41 which is engaged by a driving chain 42. Chain 42 also engages a sprocket 43 attached to countershaft 44, (Fig. 6), suitably mounted in bearings and parallel to, but beneath drum 3. Shaft 44 may be driven by any suitable motor, for example by a spring barrel motor 45, provided with a release control pawl and ratchet arrangement 46, and a clutch arrangement 47, these parts corresponding to parts 28a and 30 above described. Normally the motor spring is wound up, but is prevented from turning the shaft 48 by reason of the retaining pawl device 46. Likewise, normally the shiftable element of clutch 47 is unclutched. However, when a key in row D is operated, it causes the link 49 to raise member 50 to release the retaining pawl, and at the same time link 49 engages member 51 to couple the motor 45 in driving relation to shaft 48. Shaft 48 through suitable reduction gearing (not shown), causes shafts 44 and 40 to rotate.

It should be observed that in order to stop the rotary motion of the drum, a percentage-type selecting mechanism is provided similar to that employed for stopping the selective motion of carriage 15. However, in the case of the drum, the shaft 44 carries a helical cam or ridge 52 (Fig. 7), which is adapted to be engaged by any one of a hundred selective stops 27' which normally clear the cam 52. When one of the stops 27' is selected it is shifted into the path of the cam 52 so that it stops the drum 3 with a corresponding selected character in registry with hammer 1. Since the drum has no definite normal position, when it has been stopped selectively, it remains in that position until rotated again for the next selection. If desired however, the drum 3 may be in continuous rotation between its selective stoppings.

Figure 4:
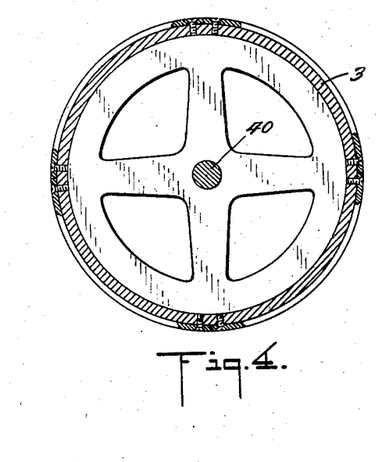
Fig. 4 is a diametrical schematic view of the type face drum of Figs. 1 to 3.
Figure 5:
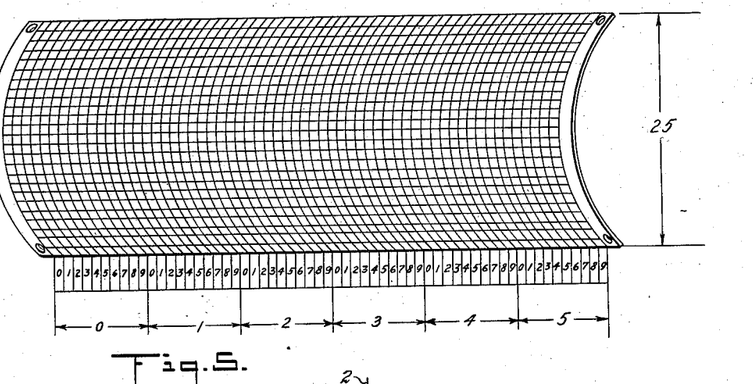
Fig. 5 is a detailed perspective view of one of the type face quadrants of Fig. 4.

The type faces are mounted or cast on four separate cylindrical quadrants, one of which is shown in Fig. 5, and the quadrants are adapted to be bolted or otherwise fastened around the periphery of the drum 3 as shown in Fig. 4. Alternatively the type faces may be in a single complete cylindrical surface or support.

The A and B digit selectors

Figure 8:
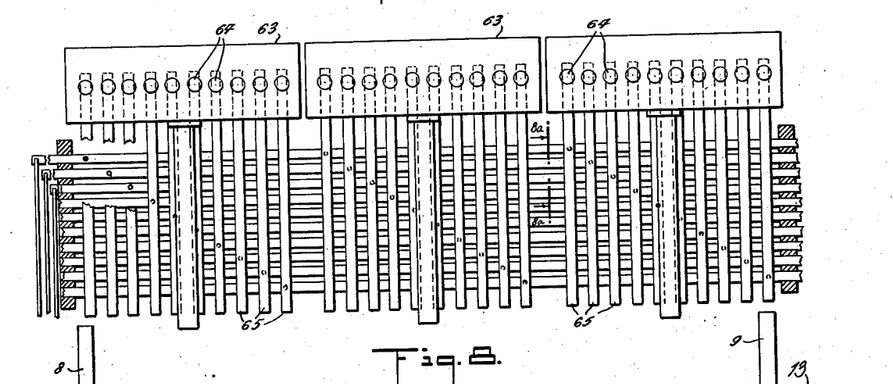
Fig. 8 is an enlarged sectional view of Fig. 6, taken along the line 8—8 thereof viewed in the direction of the arrows.
Figure 15:
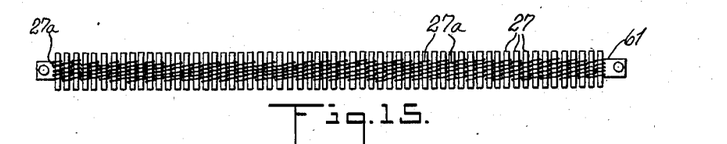
Fig. 15 is a plan view of one bank of selective stops.
Figure 16:
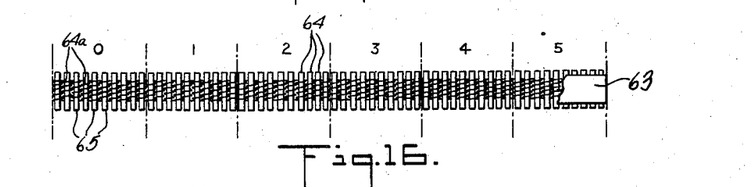
Fig. 16 is a plan view of the group-stop selectors cooperating with the stops of Fig. 15.
Figure 17:
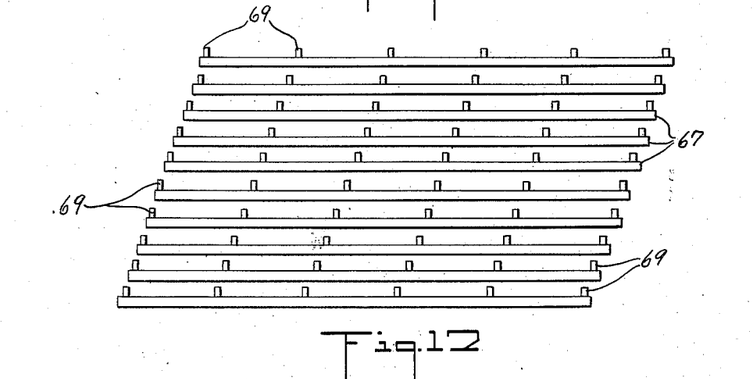
Fig. 17 is an exploded view of the unit-stop selectors cooperating with those of Figs. 15 and 16.
Figure 18:
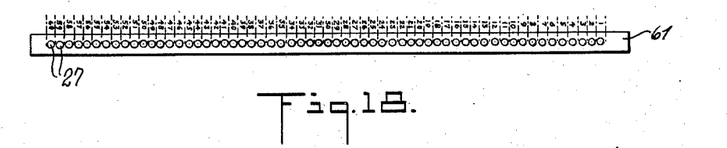
Fig. 18 is a front view of Fig. 15.

As stated above, the keys in rows A and B control the setting of carriage 15, and therefore of hammer 1. For this purpose, there is mounted in a suitable bracket 60 and extending across the machine in the rear of carriage 15, a pin block 61, in which are slidably mounted sixty stop pins 27 (Figs. 6, 8 and 15). Each pin is provided with an individual retractile spring 27a, so that it is normally held to the right (Fig. 6) so as to clear the stop lug 23 which depends from the carriage 15. Attached to the rear end of each numerical key lever 36 in row A, is a block 63 (Figs. 6, 8 and 16), each block having ten pins 64 slidably mounted therein, said pins being in the same vertical planes with the corresponding series of pins or stops 27. Each pin 64 has an individual retractile spring 64a, which normally holds the left-hand end of pin 64, spaced clear of the right-hand end of the corresponding pin 27. The blocks 63 are normally held in raised position as shown in Fig. 6 either by the key lever tension springs or by individual springs (not shown), so that the pins 64 are vertically clear of the pins 27. Each pin 64 has, at its right-hand end, a downwardly depending arm 65. Consequently, as any one of the numerical keys in row A is operated, it causes the corresponding block 63 to be lowered, thus bringing the corresponding set of ten pins 64 into alignment with the corresponding ten pins 27.

Mounted in the rear of members 65 is a slotted frame 66 (Fig. 8a) in which are slidably mounted above one another, ten bars 67, each bar being individually connected through suitable lever links 68 to a corresponding one of the keys in row B. Merely for explanatory purposes, the bars 67 are shown in exploded views in Fig. 17. The bars 67 extend transversely to all the sixty members 65. However, each bar 67 has six pins 69 each allotted to the corresponding pin 64 in each of the groups in blocks 63. Thus, the top bar 67 (Figs. 6, 8, 8a and 17) has six pins 69 on its face, each of which six pins is in alignment with the first pin 64 in each of the blocks 63. Likewise, the next lower bar 67 has six pins each of which is in alignment with the second pin 64 in each of the blocks 63. The pins 69 normally clear the members 65. However, when a key in row B is operated, the corresponding six pins 64 in each of the blocks 63 are pushed by the selected bar 67. But while six pins 64 are thus pushed, only one is effective to set a stop 27, because only one of the blocks 63 has been lowered by prior operation of a numerical key in row A. Consequently, only one of the stops 27 is pushed into the path of lug 23. It will be understood that the keys of the various rows are of the locking type so that when depressed they remain depressed. However, they are provided with a common unlocking means which is connected through suitable links (not shown) to the key T, so that when the latter is operated and then released, it releases all the previously operated keys. Since key locking and releasing mechanisms of this type are well known in the art, detailed description thereof is not required herein. As above described, when a key in row B is operated, the shaft of motor 48 is released and clutch 30 is operated to cause the carriage 15 to be driven to the right until the lug 23 engages the selected stop 27. Preferably, the key levers of row B operate the members 33 and 34 through suitable lost motion links (not shown) to allow the pins 27 to be selectively operated before the carriage starts its sliding movement. If desired, the members 33 and 34 can be connected to a common bar which is operated when any of the stops 27 is selectively moved to stopping position, thus insuring that the selection of the stops is effected prior to the movement of the carriage. It should be observed that during this selective movement of carriage 15, the paper holder 5 moves with it as a unit, and when the carriage 15 returns to normal after the printing it carries with it the paper holder. However, as pointed out above, the printing key T is connected to pawl 16 so that when it is released after printing, the paper holder 5 is automatically indexed one letter space to the left and remains in this relation to carriage 15 until the next character is printed.

The C and D digit selectors

The means for selectively stopping the drum rotation is substantially the same as that described for the A and B selection and the corresponding parts in Fig. 6 are designated by the same numerals primed. In order that the sequence of the selective setting of the stops may be more clearly understood, reference may be had to Figs. 10 to 13 which show diagrammatically the successive stops in the four key selections.

Figure 10:
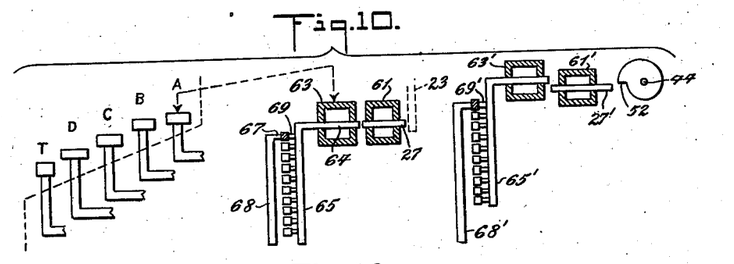
Figs. 10 to 13 are diagrammatic explanatory views showing the various stages in the setting of the selective stops for the paper carriage and printing drum respectively.
Figure 11:
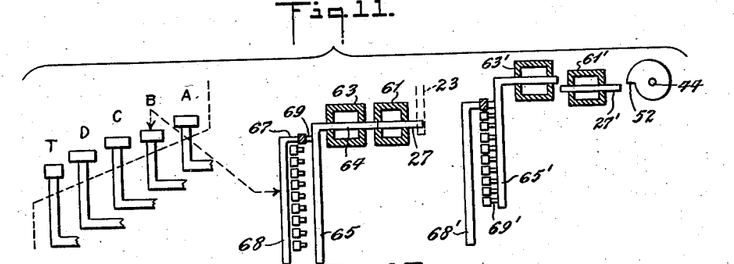
Figure 12:
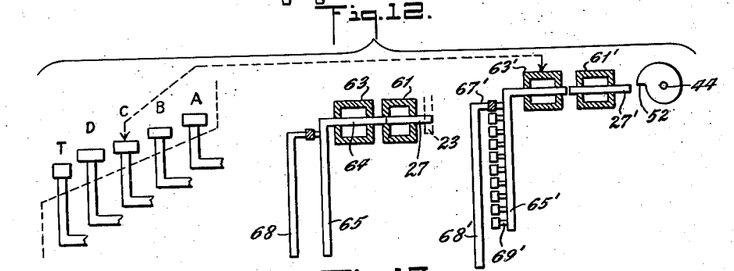
Figure 13:
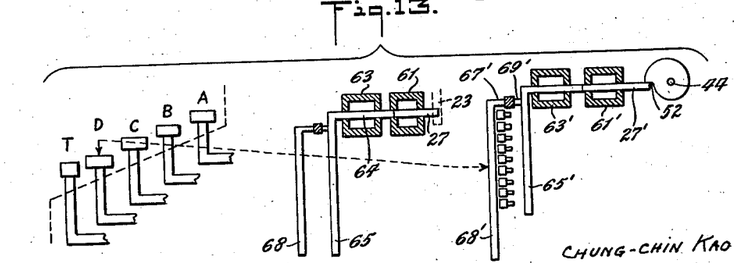

Fig. 10 shows how in response to the operation of a numerical key in row A the corresponding block 63 is lowered. Fig. 11 shows how the operation of a key in row B operates one of the bars 67 whereby the selected stop 27 is positioned in the path of the stop-lug 23. Fig. 12 shows how the operation of a key in row C selects one of the pin blocks 63', whereas Fig. 13 shows how the operation of key in row D selects one of the bars 67' so as to project a particular one of the hundred stops 27' into the path of the helical cam 52. While in the foregoing the machine is capable of printing any one of 6000 characters, it will be obvious that by using the additional four keys in row A and using additional corresponding group and units selectors together with additional four circumferential rows of characters on the drum, the machine can be used to print as many as 10,000 different characters. It will also be understood that the machine may be designed to print a smaller number of characters with a corresponding reduction of the selective mechanism.

The electrically controlled typewriter

Figure 19:
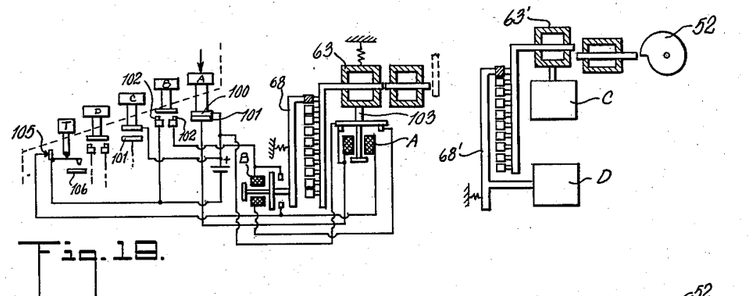
Figs. 19 to 22 are schematic diagrams similar to those of Figs. 10 to 13 explanatory of another embodiment of the invention employing electrical controls between the keyboard and the selective mechanism.
Figure 20:
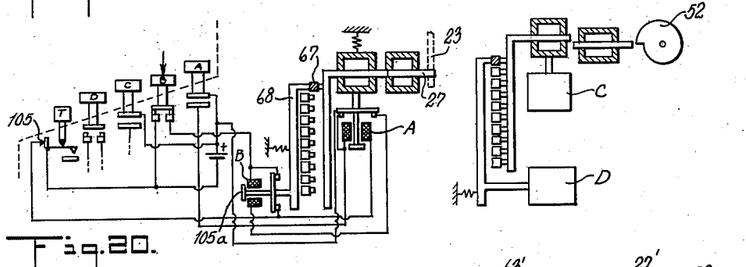
Figure 21:
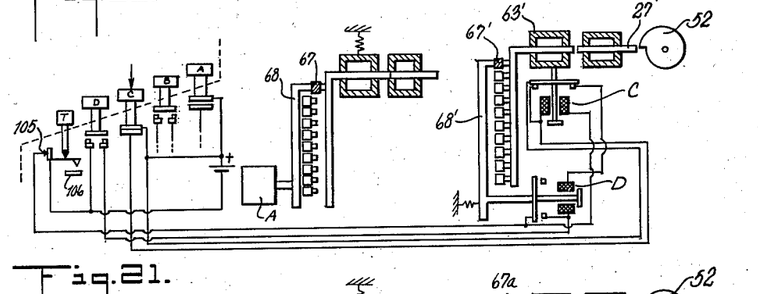
Figure 22:
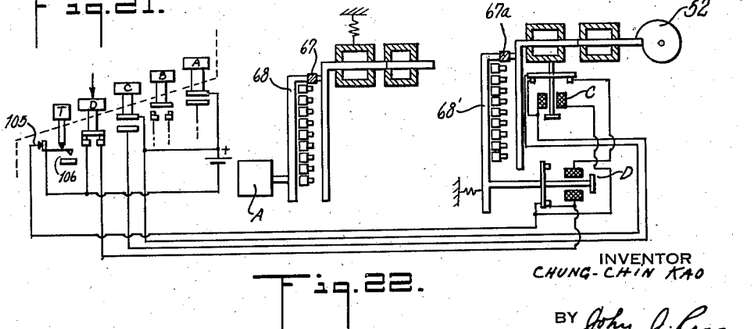
Figure 23:
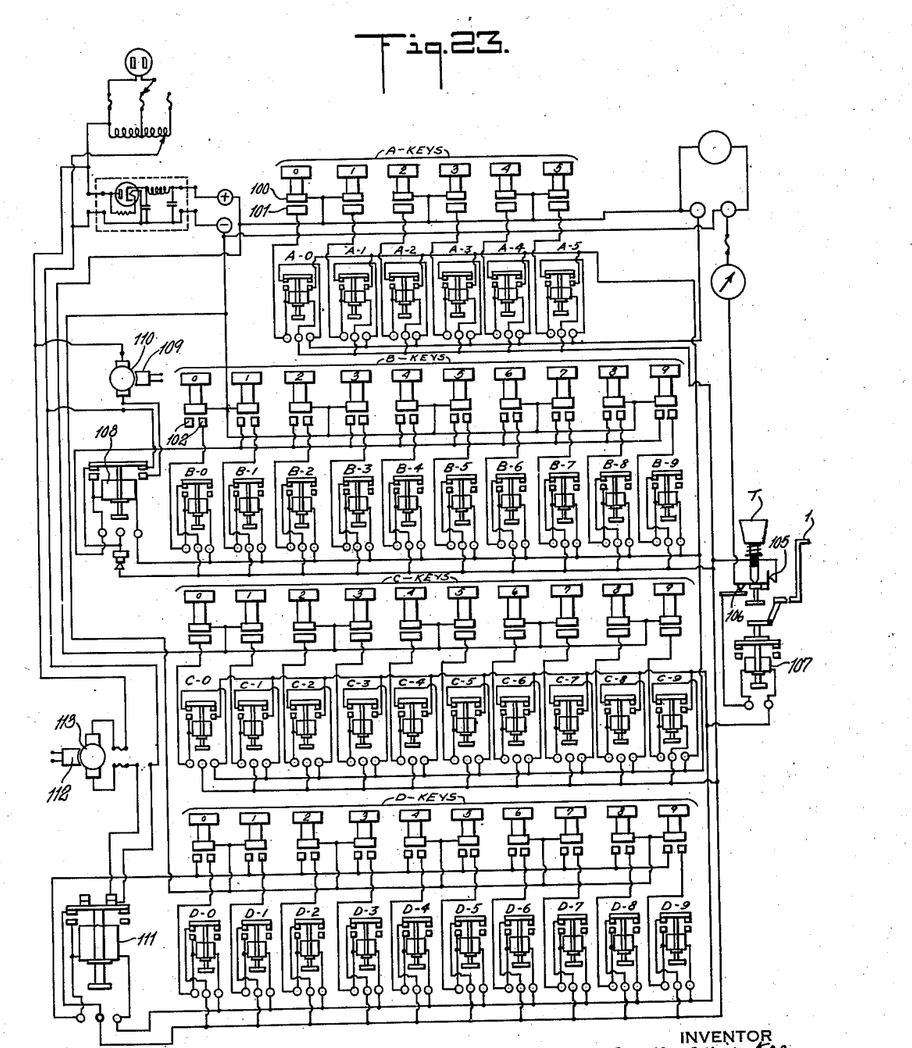
Fig. 23 is a schematic wiring diagram of the electrical circuits utilized in the electrical embodiment of the invention.
Figure 24:
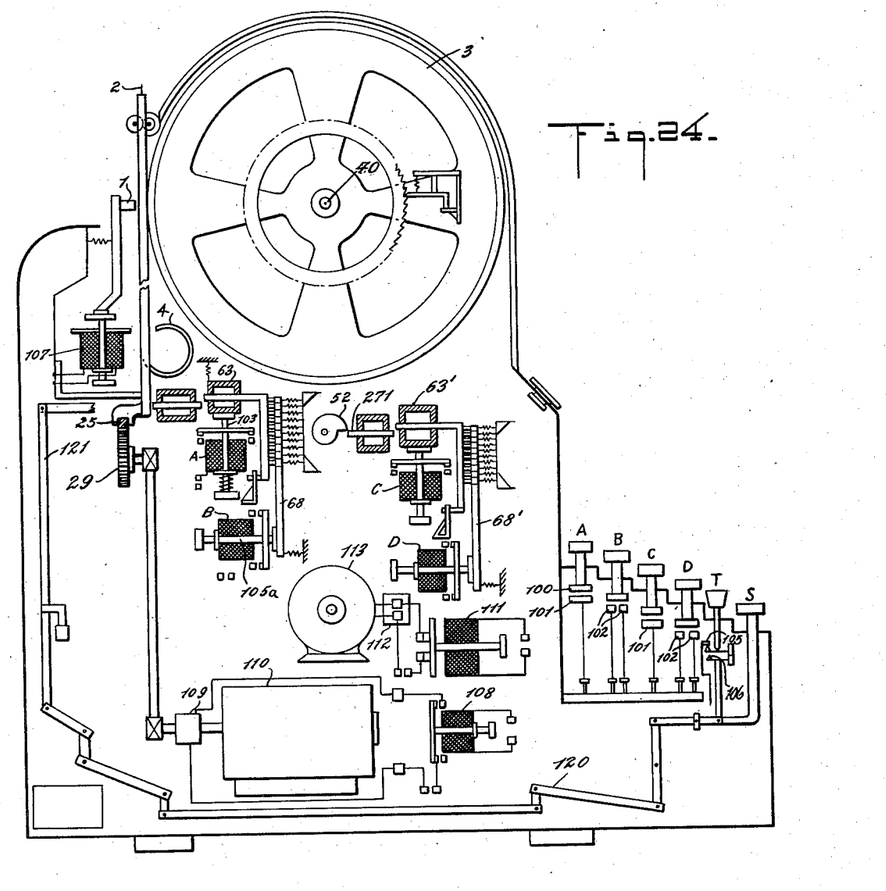
Fig. 24 is a view similar to Fig. 6 but showing the electrical embodiment with which the circuits of Fig. 23 cooperate.
Figure 28:
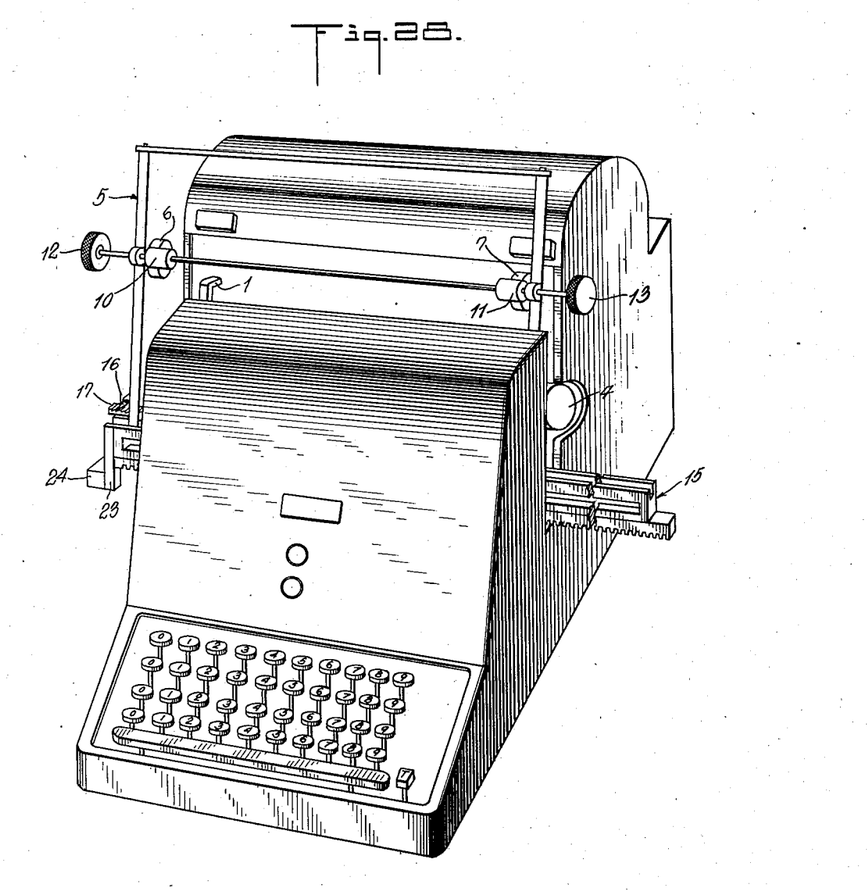
Fig. 28 is a perspective front view of the typewriter according to the invention.

In the foregoing, the typewriter is entirely mechanically controlled. It will be clear that the invention can be embodied in an electrically controlled typewriter. In this embodiment (Figs. 19–24), each of the numerical keys in rows A, B, C and D, is provided with a contact 100, which is movable with the key but insulated therefrom. Cooperating with the movable contacts of key rows A and C, are corresponding stationary contacts 101; and cooperating with the movable contacts of the B and D keys, are corresponding double contact sets 102, the contacts of each set being insulated from each other and being adapted to be bridged by the cooperating movable contact of the key. The contacts of the A keys are connected (Fig. 23) to respective electromagnets A—0 to A—5. One of these magnets is schematically illustrated in Figs. 19 and 24, and its armature or plunger 103 is connected to the pin block 63. Likewise, each of the remaining numerical keys in row A is connected to its respective magnet which controls a respective pin block 63. The keys of row B are likewise individually connected to respective electromagnets B—0 to B—9 (Fig. 23), one of these magnets being schematically shown in Figs. 20 and 24 and its plunger 105a is connected to the corresponding bar 69. Therefore, by the successive operation of keys A and B, one of the sixty stops 27 is selectively moved into the path of a lug attached to the stopping of the paper carriage as already described. In a similar manner, the keys of row C control their respective electromagnets C—0 to C—9 (Fig. 24), whose plungers are connected respectively to the pin block 63'. Likewise, the keys of row D control respective electromagnets D—0 to D—9 (Fig. 23), and thus control respective members 68' to project the desired stop 27' into the path of cam 52 as above described. Each of the magnets A—0 to A—5, B—0 to B—9, C—0 to C—9, and D—0 to D—9, are so arranged that when they are operated they remain electrically locked over a circuit which extends through the normally closed contact 105 of the printing key T. This printing key has another contact set 106 which is normally open but which closes when the key is depressed. However, this contact set 106 is so arranged that it closes before the contact set 105 is broken. When the contact set 106 is closed, it completes a circuit through electromagnet 107, which operates the printer hammer 1.

Figures 8A, 14, 25, 26:
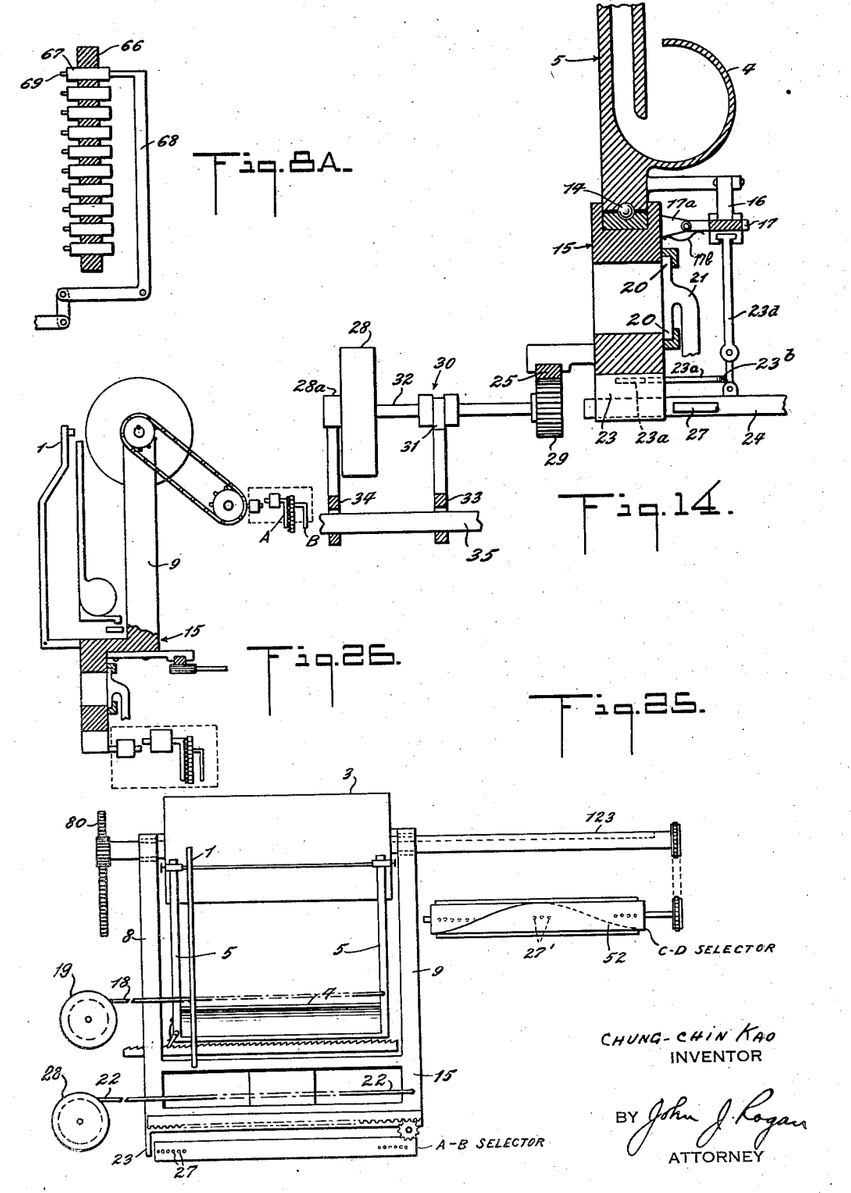
Fig. 8a is a sectional view of Fig. 8, taken along the line 8a—8a thereof.
Fig. 14 is an enlarged view of part of the mechanism of Fig. 6.
Figs. 25 and 26 are detailed views of another embodiment of the invention.
Figure 9:
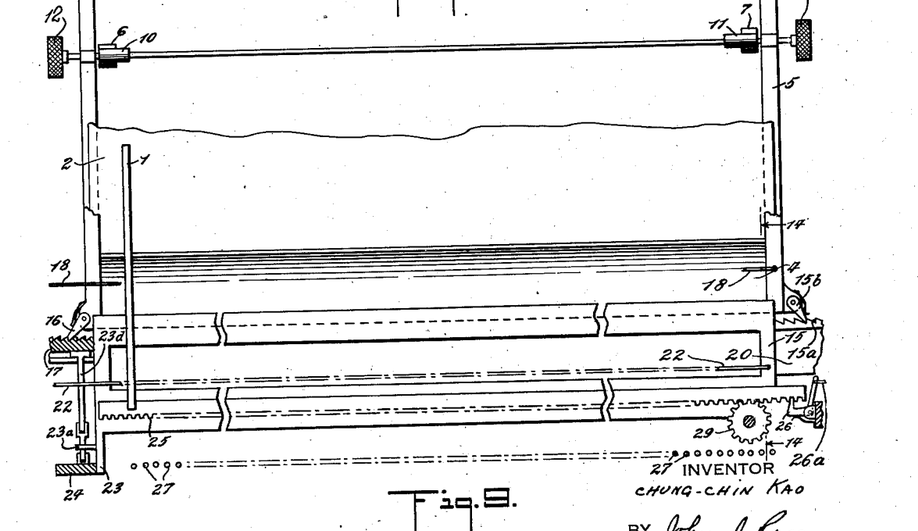
Fig. 9 is an enlarged view of the paper holder, paper carriage and associated control mechanism.

It should be noted that when any of the magnets B—0 to B—9 is operated, it completes a circuit through the clutch control magnet 108, which in turn operates a magnetic clutch 109 corresponding functionally to the mechanical clutch 30 (Fig. 14). This connects the continuously running electric motor 110 (which corresponds functionally to the spring motor 28 of Fig. 6), to drive the pinion 29. The clutch 109 is of the slip-friction type so that when the paper carriage is stopped, the motor can continue to rotate. Likewise, when any of the keys of the group D—0 to D—9 is operated, it completes the circuit through the clutch control magnet 111, which in turn closes a circuit through another magnetic clutch 112 (corresponding functionally to the clutch 47 of Fig. 6), thus connecting another electric motor 113 in driving relation with the drum shaft 40. Here again the clutch 112 is preferably of the slip-friction type. When the drum has been thus selectively positioned and the printing key T is operated, the locking circuits for the various electromagnets are open and the two clutches are deenergized. On the backward stroke of the printing hammer, the retaining pawl 26 (Fig. 9) is released to allow the cable 22 to pull the carriage 15 back to normal position in engagement with stop 24. It will be observed that in this connection, the cable 22 may be replaced by a tension spring. All the electrical controls above described are now returned to normal condition in readiness for the next printing selection.

The method of selectively stopping the paper carriage and the drum is the same as above described in connection with the mechanical embodiment of the machine. In Fig. 24, the printing key T is also connected through a mechanical linkage 120 to control the escapement of the spring motor 121 which controls the letter space indexing movement of the paper carriage so that after the printing hammer has operated, the paper is automatically indexed one letter space to the left. The usual spacer bar 5 is also connected in the well-known manner to the paper carriage release so that the paper can be letter-spaced without printing.

Referring to Figs. 25 and 26, there is illustrated a still further embodiment of the invention which is substantially identical with that of Figs. 1 to 18. In this embodiment however, the paper carriage 5 is not movable on the selective carriage 15 but is independently supported for indexing motion as is customary with the paper carriages of usual typewriters. On the contrary, the drum 1 is not only rotated as above described but is also longitudinally moved in order to present the desired type face to the printing point. Thus, as shown in Fig. 25, the drum 3 is keyed to the driving shaft 123 in such a way that as the shaft 123 rotates it causes the drum 3 to rotate. Likewise, the drum 3 is slidably keyed on shaft 123 so that it can be moved longitudinally thereof. In order to effect the longitudinal movement of the drum, the arms 8 and 9 above described are extended and their upper ends are forked so as to partially surround the shaft 123 and to engage the drum ends. The arms 8 and 9 form part of the carriage 15 above described which is selectively moved to the right (Fig. 25) until the lug 23 engages one of the selective stops 27. The stops 27 are set under control of the A and B key rows as above described. The rotational selective movement of the drum 3 is controlled by the C and D key rows under control of the stops 27' which cooperate with the helical cam 52.

The only essential difference therefore between the embodiment of Figs. 25 and 26 and that of Figs. 1 to 18 is that in the embodiment of Figs. 25 and 26, the ordinary paper holder 5 does not selectively move to the right, but of course is indexible to the left for letter spacing in the usual manner. Therefore, the paper does not move during the selective operation of the mechanism; the first selective movement resulting in the setting of member 15 merely positions the drum 3 with the proper circumferential row of characters in line with the printing hammer 1. The next selective movement controlled by the C and D key rows causes the drum 3 to be rotated as above described to present the selected character in the selected circumferential row to the printing point. The printing key is thereupon operated to cause the printing hammer to print the desired character on the paper. It is believed that the manner of operation of the embodiment of Figs. 25 and 26, will be clear from the descriptions already given. It will be understood, of course, that the selective mechanisms for the embodiment stops 27 and 27' of Figs. 25 and 26, may be controlled entirely mechanically from the keyboard; or, if desired, the selecting mechanisms for the stops 27 and 27' may be controlled electrically as described in connection with Figs. 19 to 23.

Referring to Fig. 27, the foregoing described embodiments are illustrated diagrammatically so as to simplify the sequence of operations. Thus, when a key in each of the rows A and B is operated, the appropriate stop 27 of the A—B digit selector is set. At the same time the motor 28 causes the member 15 together with the paper carriage 5, to be drawn to the right against the tension of cable 22 until the stop lug 23 engages the selected stop 27. It will be understood that the A—B digit selector can be set either mechanically under control of the A—B key rows as in the embodiment of Figs. 1 to 18, or electrically as in the embodiment of Figs. 19 to 24. If the motor 28 is a spring barrel motor, it will be wound up during the manual return of the paper carriage to its normal position at the end of each line as is well-known in typewriter constructions. The member 15 is retained in its selected stopped position by means of the detent 26 which cooperates with the tooth member 29. It will be understood, of course, that the showing of Fig. 27 is schematic and that the parts 26 and 29 may correspond to the parts 26 and 29 (Fig. 9). When the member 15 together with the printing hammer 1 has been selectively moved and stopped, a key in each of the rows C and D is operated to set the selected stop 27' of the C—D digit selector. This selector may be set either mechanically from the key rows, or electrically as above mentioned. If the drum 3 is in continuous rotation, it is stopped in its selected position by engagement of the cam 52 with the selected stop 27'. In Fig. 27 the cam 52 is illustrated in the form of one hundred discrete lugs helically arranged around the drum shaft but it will be understood, of course, that a single continuous helical ridge may be employed in place of these individual cams. The selected character on the drum 3 is now in registry with the printing hammer 1. Consequently when the key T is depressed, it operates the said hammer to press the paper on the paper carriage against the selected character, it being understood that the usual inked ribbon (not shown) is located between the drum and the paper. When the printing key is released, the various selector mechanisms are restored to normal as above described and at the same time a detent such as the detent 16 (Fig. 9), is momentarily released to enable the carriage 5 to be pulled by its tension cable one letter space to the left. The motors M1 and M2 may be spring motors similar to motors 28 and 45 (Fig. 6), or continuously running electric motors similar to motors 110, 113, (Fig. 24) with intervening slip-friction clutches 109, 112.

Various changes and modifications may be made in the disclosed embodiments without departing from the spirit and scope of the invention. While in the foregoing embodiment reference is made to 6000 characters, it will be obvious that by using the four additional blank keys in row A with their corresponding additional group selectors like 63, the number of characters may be increased to 10,000.

This application is a continuation of application Serial No. 493,722, filed July 7, 1943.

What I claim is:

1. A keyboard-controlled typewriter of the character described comprising a type-face carrier, a printing hammer, means to produce relative movements between said carrier and said hammer, said movements being in coordinate directions and the location of each type face on the carrier being identified by numerical coordinates, a keyboard having the keys thereof arranged in groups corresponding to the coordinates of said type faces, first digit selecting elements operable in groups, second digit selecting elements individually operable to select one of the elements in the operated group, said first and second digit selecting elements being controlled by respective groups of said keys, and means responsive to the combined setting of said first and second digit-selecting elements for controlling the relative movements between said carrier and said hammer.

2. A keyboard-controlled typewriter according to claim 1 in which the carrier is in the form of a drum mounted for rotation, and the printing hammer is mounted for movement in a plane parallel to the rotational axis of the drum.

3. A keyboard-controlled typewriter of the character described, comprising a rotary type-face drum having type faces arranged thereon in circumferential rows, a carriage movable parallel to the drum axis, said carriage having a paper holder which is movable on the carriage parallel to the drum axis for letter spacing movement, a printing hammer carried by said carriage, selectively operable means for moving said carriage and paper holder as a unit to present said printing hammer in registry with a desired row of circumferential type faces on said drum, other selectively operable means for controlling the rotary movement of said drum to present a particular type face in said row to said hammer, and means for moving the paper holder for letter spacing movement.

4. A keyboard-controlled typewriter of the character described, comprising a type-face carrier, a printing hammer, means to produce relative movements between said carrier and hammer, said movements being in coordinate directions, the location of each type face on said carrier being identified by a four-digit code number, a keyboard having four digital groups of keys, each group corresponding to one digit of a code number, a selector mechanism responsive to the operation of a key in each of the first two digital groups for controlling one of said coordinate movements, and another selector mechanism responsive to the operation of a key in each of the second two digital groups for controlling the other of said coordinate movements to present a particular type face to said printing hammer.

5. A typewriter according to claim 4 in which the type faces are arranged on the carrier in parallel circumferential rows and the first-mentioned selector mechanism comprises a series of shiftable stops equal in number to the number of type faces in each circumferential row, an equal number of shiftable operating members for said stops and arranged to be operated in groups under control of a key in the first digital row, and means responsive to the operation of a key in the second digital row for operating a particular one of the operated group members; and the said other selector mechanism comprises a series of shiftable stops equal in number to the number of type faces in each row, an equal number of shiftable operating members arranged to be operated in groups under control of the third digital key group, and means for selecting one of the last mentioned operated group of members under control of a key in the fourth digital group.

6. A keyboard-controlled typewriter for printing any one of a large number of Chinese ideographs and the like comprising a type-face drum having its type faces arranged in coordinate fashion, a printing hammer, selective mechanism for controlling relative coordinate movement between said drum and hammer to present a particular type face to the hammer, said selective mechanism comprising first and second digit selecting means, said first digit selecting means including a series of shiftable stops equal in number to the number of type faces in each row and an equal number of shiftable operating members for said stops and arranged to be operated in groups of ten, the second digit selecting means including a set of ten shiftable bars each having an operating element allotted to the corresponding ones of the shiftable operating operating members in said groups, and means to operate one of said bars to select a particular member in the operated group of said operating members and thereby to select a particular one of said stops.

7. A keyboard-controlled typewriter for printing any one of a large number of Chinese ideographs and the like comprising a type-face drum having its type faces arranged in coordinate fashion, a printing hammer, selective mechanism for controlling relative coordinate movement between said drum and hammer to present a particular type face to the hammer, said selective mechanism comprising first, second, third and fourth digit-selecting means, the first digit-selecting means including a series of shiftable stops equal in number to the number of type faces in each circumferential row and an equal number of shiftable operating members for said stops arranged to be operated in groups of ten, the second digit-selecting means including a set of ten shiftable bars each having an operating element allotted to the corresponding ones of the shiftable operating members in said groups and means to operate one of said bars and to select a particular member in the operated group of said operating members and thereby to select a particular one of said series of stops to control one of the said coordinate movements; the third and fourth digit-selecting means being substantially the same as the first and second digit-selecting means to control the other of said coordinate movements.

8. A keyboard-controlled printing machine such as a typewriter and the like comprising a drum carrying a bank of Chinese language type faces arranged in linear strips and circumferential rows, a paper holder shiftable parallel to said linear strips, a plurality of stops equal in number to the number of type faces in each linear strip, said stops being normally free of engagement with said holder, first digit-controlled means, second digit-controlled means, said first digit-controlled means being normally out of alignment with said stops, means responsive to the operation of a key in one group of keys to align a selected group of the first digit-controlled means with the corresponding group of said stops, and means responsive to the operation of a key in another group of keys to operate a particular one of the second digit-controlled means to thereby operate a particular one of said selected group and a particular one of said stops whereby said paper holder is stopped in a selected position, and means to move said paper holder until it is stopped by said particular one of said stops.

9. A keyboard-controlled printing machine according to claim 7 in which the keyboard is provided with four banks of keys, the keys of the first bank being linked to the first digit-selecting means, the keys of the second bank being linked to the second digit-selecting means, the keys of the third bank being linked to the third digit-selecting means, and the keys of the fourth bank being linked to the fourth digit-selecting means, the setting of said third and fourth digit-selecting means determining the selective stopping of said drum, and means to rotate said drum until it is stopped by the setting of a stop controlled by the third and fourth digit-selecting means.

10. A keyboard-controlled typewriter of the character described comprising a type-face drum and a printing hammer arranged to undergo relative coordinate motions to present a particular type face to the hammer, a single keyboard consisting of four groups of keys, four sets of selective members each set being controlled by a corresponding row of said keys, means responsive to the operation of a key in each of two rows for setting two of said sets of selector members to control one of said cordinate motions, and means responsive to the operation of a key in each of the two remaining rows for setting the remaining two sets of selector members to control the other coordinate motion.

11. A keyboard-controlled typewriter according to claim 10 in which a common printing control key is provided for operating the printing hammer after said four sets of selector members have been selectively operated.

12. A keyboard-controlled typewriter of the character described comprising a type-face drum, a printing hammer, means to rotate said drum, means to produce relative axial movement between said drum and hammer to present a particular type face on said drum to said hammer, an abutment movable with the drum in its axial motion, a plurality of selectively shiftable stops, a first selector means between said keyboard and said shiftable stops and including a plurality of selector members settable in different combinations to present a particular one of said stops to said abutment, another abutment movable with the drum in its rotational motion, a second plurality of selectively shiftable stops, a second selector means between said keyboard and said second set of stops and including a plurality of selector members settable in different combinations to present a particular stop of the second set to said other abutment.

13. A keyboard-controlled typewriter according to claim 12 in which said drum is operated axially by means of a frame which carries a driving rack in engagement with a driving pinion, and the second-mentioned abutment is in the form of helically arranged cam means.

14. A keyboard-controlled typewriter according to claim 12 in which said drum is provided with means for returning it to a normal position axially at the completion of each operation of said printing hammer.

15. A keyboard-controlled typewriter according to claim 12 in which a pair of slip clutches are provided for applying the rotary motive power to the drum and for applying the axial motive power, means responsive to the setting of the first-mentioned selector means for operating one of said clutches, and means responsive to the setting of the second-mentioned selector means for operating the other of said clutches.

16. A keyboard-controlled typewriter comprising a type-face drum, rotary motion stopping cam means, axial motion stopping cam means, a first selector mechanism cooperating with the rotary motion cam and including a plurality of selector members settable in different combinations, a second selector mechanism cooperating with the axial motion cam and including a plurality of members settable in different combinations. a slip-friction clutch for the rotary motion, a slip-friction clutch for the axial motion, each of said selector mechanisms comprising a series of shiftable group members and a series of shiftable unit members, a keyboard having four groups of keys one group being allotted to the group selector members in the first selector, another key group being allotted to the unit selector members in the first selector, a third key group being allotted to the group selector members in the second selector, a fourth key group being allotted to the units selector members in the second selector, means responsive to the operation of a key in the first key group for selectively operating one of the group selector members in the first selector, means responsive to the operation of a key in the second group for operating a unit selector in said first selector and for operating one of said clutches, means responsive to the operation of a key in the third key group for selectively operating one of the group selectors in the second selector, and means responsive to the operation of a key in the fourth group for operating a unit selector in said second selector and for operating the other of said clutches.

17. A keyboard-controlled typewriter for printing any one of a large number of characters employing a very much smaller number of keys, comprising a drum having character type faces arranged in successive rows, means to rotate said drum, stop means for stopping the rotation of the drum to present a desired type face to a printing position, and keyboard-controlled selector mechanism for controlling said stop means, said selector mechanism comprising a series of movable stops, a first set of selectively shiftable members arranged in groups but normally out of registry with said stops, a second set of selectively shiftable members, means to operate a selected group of said first set to bring said selected group into registry with a corresponding number of said stops, and means to selectively operate one of said second set of shiftable members and thereby to move one of said stops to a selected position through the intermediary of a particular member of the operated group in said first set.

18. A keyboard-controlled typewriter according to claim 17 in which said first set of shiftable members are located between the said stops and said second set of shiftable members.

19. A keyboard-controlled typewriter according to claim 17 in which said first set of shiftable members are mounted for movement in groups in a direction transverse to the line of action of said second set of shiftable members, the individual shiftable members of said first set being also mounted for individual movement in a direction parallel to the line of action of said second set of members.

20. In a Chinese language typewriter and the like, a rotary type face drum, a shaft on which said drum is slidably keyed for rotation with the shaft, means to rotate said shaft and drum, means to move said drum axially along said shaft, a first selector mechanism for controlling the rotary stopping of said drum, a second selector mechanism for controlling the stopping of the axial movement of said drum, each of said selector mechanisms including a series of tens and a series of units selector devices, a keyboard having four groups of keys; one group for controlling the setting of the tens selector device of the first selector mechanism, a second group for controlling the units selector device of the first selector mechanism, a third group for controlling the tens selector device of the second selector mechanism, and the fourth group for controlling the units selector device of the second selector mechanism; and means responsive to the operation of a key in each group for setting the corresponding selector devices and thereby controlling the rotary and axial movements of said drum to present a particular type face on the drum to a common printing point.

21. A Chinese language typewriter according to claim 20 in which electro-magnets are provided respectively for each tens selector device for operating it independently of the remaining tens selector devices in the series, and electro-magnets are provided for operating each units selector device; energizing circuits are provided between the keyboard and said electro-magnets for controlling energization thereof; and a common printer control key is provided, said key having contacts which control the energizing and release circuits of said electro-magnets.

22. A keyboard-controlled typewriter comprising a type face drum, a printing hammer, means to produce relative coordinate motions between the drum and hammer to present a particular type face to the hammer; a first selector mechanism comprising tens and units selector devices for controlling one of said coordinate motions, a second selector mechanism also comprising tens and units selector devices for controlling the other of said motions; a keyboard having the keys arranged in four groups, one group corresponding to the tens selector device of the first selector mechanism, the second group corresponding to the units selector device of the first selector mechanism, the third group corresponding to the tens selector device of the second selector mechanism, and the fourth group corresponding to the units selector device of the second selector mechanism, electro-magnetic means controlled by the respective keys in each of said groups for setting the corresponding selector devices, and selectable stop means for said drum controlled by the setting of said selector devices.

23. A keyboard-controlled typewriter according to claim 22 in which each of said tens selector devices comprises a plurality of sets of shiftable elements each set having a common electro-magnet for operating the set independently of the remaining sets, and each of said units selector devices is provided with a series of electro-magnets for operating it to select a particular member in the operated set of tens selector devices.

CHUNG-CHIN KAO.